United States Patent
Fujita et al.

(10) Patent No.: US 6,683,139 B2
(45) Date of Patent: Jan. 27, 2004

(54) PROCESS FOR PRODUCING SOLID PRODUCT, SOLID CATALYST COMPONENT, AND CATALYST FOR OLEFIN POLYMERIZATION, AND PROCESS FOR PRODUCING OLEFIN POLYMER

(75) Inventors: Masayuki Fujita, Ithaca, NY (US); Yoshinori Seki, Ichihara (JP); Hiroyoshi Nakajima, Ichihara (JP)

(73) Assignee: Sumitomo Chemical Company, Limited, Osaka (JP)

(*) Notice: Subject to any disclaimer, the term of this patent is extended or adjusted under 35 U.S.C. 154(b) by 33 days.

(21) Appl. No.: 10/025,708

(22) Filed: Dec. 26, 2001

(65) Prior Publication Data

US 2002/0128402 A1 Sep. 12, 2002

(30) Foreign Application Priority Data

Dec. 27, 2000 (JP) ........................................ 2000-398555

(51) Int. Cl.[7] .................................................. C08F 4/16
(52) U.S. Cl. .................... 526/129; 526/348; 526/124.3; 526/158; 526/125.1; 526/128; 502/103; 502/115; 502/116; 502/126; 502/127; 502/128
(58) Field of Search ............................ 526/348, 124.3, 526/158, 123.1, 129, 128; 502/103, 115, 116, 126, 127, 128

(56) References Cited

U.S. PATENT DOCUMENTS

| | | | |
|---|---|---|---|
| 4,672,050 A | | 6/1987 | Sasaki et al. |
| 4,743,665 A | | 5/1988 | Sasaki et al. |
| 4,822,763 A | * | 4/1989 | Matsuura et al. ........... 502/113 |
| 4,900,706 A | | 2/1990 | Sasaki et al. |
| 4,916,099 A | | 4/1990 | Sasaki et al. |
| 4,940,682 A | | 7/1990 | Sasaki et al. |
| 5,077,250 A | | 12/1991 | Miyoshi et al. |
| 5,308,811 A | | 5/1994 | Suga et al. |
| 5,608,018 A | * | 3/1997 | Ebara et al. ............... 526/119 |
| 5,641,828 A | | 6/1997 | Sadatoshi et al. |

FOREIGN PATENT DOCUMENTS

| | | | |
|---|---|---|---|
| EP | 0 306 939 A1 | | 3/1989 |
| EP | 0 567 286 A1 | | 10/1993 |
| EP | 0 747 400 A1 | | 12/1996 |
| JP | 03043283 B | | 7/1991 |
| JP | 09118792 A | | 5/1997 |
| JP | 10-212319 A | * | 8/1998 |
| JP | 2972161 B2 | | 11/1999 |
| WO | WO 97/07887 A1 | | 3/1997 |

\* cited by examiner

Primary Examiner—Ling-Siu Choi
(74) Attorney, Agent, or Firm—Sughrue Mion, PLLC

(57) ABSTRACT

There are provided (1) a process for producing a solid product, which comprises the step of reducing a titanium compound represented by the following formula [I] with an organomagnesium compound in the presence of an organosilicon compound having an Si—O bond, an inorganic fine particle and optionally an ester compound,

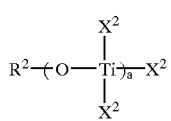

[I]

(2) a process for producing a solid catalyst component, which comprises the step of contacting the solid product obtained by the above process, a halogenation ability-carrying halogeno compound, and an inner electron donor compound, (3) a process for producing a catalyst, which comprises the step of contacting the solid catalyst component obtained by the above process, an organoaluminum compound, and an outer electron donor compound, and (4) a process for producing an olefin polymer, which comprises the step of polymerizing an olefin in the presence of the catalyst obtained by the above process.

26 Claims, No Drawings

PROCESS FOR PRODUCING SOLID PRODUCT, SOLID CATALYST COMPONENT, AND CATALYST FOR OLEFIN POLYMERIZATION, AND PROCESS FOR PRODUCING OLEFIN POLYMER

FIELD OF THE INVENTION

The present invention relates to (i) a process for producing a solid product, (ii) a process for producing a solid catalyst component for olefin polymerization using the solid product, (iii) a process for producing a catalyst for olefin polymerization using the solid catalyst component, and (iv) a process for producing an olefin polymer using the solid catalyst.

BACKGROUND OF THE INVENTION

As a process for improving physical properties such as rigidity and heat resistance of an olefin polymer, there is known a process, which comprises a step of melt-kneading the olefin polymer with an inorganic substance, thereby granulating the inorganic substance into fine particles and dispersing the fine particles in the olefin polymer.

However, the above-mentioned process has a problem that the inorganic substance cannot be fully granulated, so that dispersion of the inorganic substance in the olefin polymer is not sufficient.

SUMMARY OF THE INVENTION

An object of the present invention is to provide a process for producing an olefin polymer in which a finely granulated inorganic substance is satisfactorily dispersed.

Another object of the present invention is to provide a process for producing a catalyst, which catalyst is suitable for the above-mentioned process for producing an olefin polymer.

A further object of the present invention is to provide a process for producing a solid catalyst component, which component is suitable for the above-mentioned process for producing a catalyst for olefin polymerization.

A still further object of the present invention is to provide a process for producing a solid product containing a finely granulated inorganic substance, which solid product is suitable for the above-mentioned process for producing a solid catalyst component.

The present invention provides a process for producing a solid product (A), which comprises the step of reducing a titanium compound represented by the following formula [I] with an organomagnesium compound in the presence of an organosilicon compound having an Si—O bond and an inorganic fine particle,

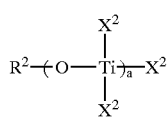

[I]

wherein "a" is a number of 1 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another.

The present invention also provides a process for producing a solid product (B), which comprises the step of reducing a titanium compound represented by the above-mentioned formula [I] with an organomagnesium compound in the presence of an organosilicon compound having an Si—O bond, an ester compound and an inorganic fine particle.

The present invention further provides a process for producing a solid catalyst component (A) for olefin polymerization, which comprises the step of contacting:

(i) the solid product (A) obtained by the above-mentioned process, (ii) a halogenation ability-carrying halogeno compound (namely, a halogeno compound which has an ability to halogenate), and (iii) an inner electron donor compound.

The present invention still further provides a process for producing a solid catalyst component (B) for olefin polymerization, which comprises the step of contacting:

(i) the solid product (B) obtained by the above-mentioned process, (ii) a halogenation ability-carrying halogeno compound, and (iii) an inner electron donor compound.

The present invention additionally provides a process for producing a catalyst (A) for olefin polymerization, which comprises the step of contacting:

(a) a solid catalyst component (A) obtained by the above-mentioned process, (b) an organoaluminum compound, and (c) an outer electron donor compound.

The present invention also additionally provides a process for producing a catalyst (B) for olefin polymerization, which comprises the step of contacting:

(a) a solid catalyst component (B) obtained by the above-mentioned process, (b) an organoaluminum compound, and (c) an outer electron donor compound.

The present invention further additionally provides a process for producing an olefin polymer, which comprises the step of polymerizing an olefin in the presence of a catalyst (A) obtained by the above-mentioned process.

The present invention still further additionally provides a process for producing an olefin polymer, which comprises the step of polymerizing an olefin in the presence of a catalyst (B) obtained by the above-mentioned process.

DETAILED DESCRIPTION OF THE INVENTION

Preferable examples of the organosilicon compound having an Si—O bond used in the present invention are those represented by any one of the following formulas (1) to (3).

wherein $R^{10}$ is a hydrocarbon group having 1 to 20 carbon atoms; $R^{11}$, $R^{12}$, $R^{13}$, $R^{14}$ and $R^{15}$ are independently of one another a hydrocarbon group having 1 to 20 carbon atoms or a hydrogen atom; "t" is a number satisfying $0<t\leq 4$; "u" is an integer of from 1 to 1000: and "v" is an integer of from 2 to 1000.

Examples of the organosilicon compound are tetramethoxysilane, dimethyldimethoxysilane, tetraethoxysilane, triethoxyethylsilane, diethoxydiethylsilane, ethoxytriethylsilane, tetra-i-propoxysilane, di-i-propoxy-di-i-propylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethyl polysiloxane, diphenyl polysiloxane, methylhydro polysiloxane and phenylhydro polysiloxane.

Among the organosilicon compounds represented by the above formulas (1) to (3), more preferable are those represented by the formula (1), wherein satisfying $1 \leq t \leq 4$ is preferable. Of these, tetraalkoxysilane compounds of t=4 are particularly preferred, and the most preferred is tetraethoxysilane.

Examples of $R^2$ in the above formula [I] representing the titanium compound used in the present invention are alkyl groups such as methyl, ethyl, propyl, i-propyl, butyl, i-butyl, amyl, i-amyl, hexyl, heptyl, octyl, decyl and dodecyl groups; aryl groups such as phenyl, cresyl, xylyl and naphthyl groups; cycloalkyl groups such as cyclohexyl and cyclopentyl groups; allyl groups such as a propenyl group; and aralkyl groups such as a benzyl group. Among these, alkyl groups having 2 to 18 carbon atoms and aryl groups having 6 to 18 carbon atoms are preferred, and linear alkyl groups having 2 to 18 carbon atoms are particularly preferred.

As the halogen atom represented by $X^2$ in the above formula [I], a chlorine atom, a bromine atom and an iodine atom are exemplified. Of these, a chlorine atom is particularly preferred. As hydrocarbon groups in the oxyhydrocarbon groups having 1 to 20 carbon atoms represented by $X^2$, the same hydrocarbon groups as the above-mentioned $R^2$ can be exemplified. Of these, alkoxy groups having linear alkyl groups of 2 to 18 carbon atoms are particularly preferable as $X^2$.

Preferable "a" in the above formula (I) is a number satisfying $1 \leq a \leq 5$.

Examples of the titanium compound having "a" of not less than 2 are tetra-i-propyl polytitanate (a mixture of compounds of "a"=2~10), tetra-n-butylpolytitanate (a mixture of compounds of "a"=2~10), tetra-n-hexyl polytitanate (a mixture of compounds of "a"=2~10), tetra-n-octyl polytitanate (a mixture of compounds of "a"=2~10) and a condensate of a tetraalkoxytitanium obtained by reacting a tetralkoxytitanium with a small amount of water.

More preferable titanium compounds are those represented by the following formula (4).

$$Ti(OR^2)_q X^3_{4-q} \qquad (4)$$

wherein $R^2$ is a hydrocarbon group having 1 to 20 carbon atoms, $X^3$ is a halogen atom, and q is a number satisfying $0 < q \leq 4$, preferably $2 \leq q \leq 4$, and particularly preferably q=4.

Examples of the titanium compound represented by the above formula (4) are alkoxytitanium trihalide such as methoxytitanium trichloride, ethoxytitanium trichloride, butoxytitanium trichloride, phenoxytitanium trichloride and ethoxytitanium tribromide; dialkoxytitanium dihalides such as dimethoxytitanium dichloride, diethoxytitanium dichloride, dibutoxytitanium dichloride, diphenoxytitanium dichloride and diethoxytitanium dibromide; trialkoxytitanium monohalides such as trimethoxytitanium chloride, triethoxytitanium chloride, tributoxytitanium chloride, triphenoxytitanium chloride and triethoxytitanium bromide; and tetraalkoxytitanium compounds such as tetramethoxytitanium, tetraethoxytitanium, tetrabutoxytitanium and tetraphenoxytitanium.

From a viewpoint of an activity of a catalyst obtained, preferable "a" in the above formula [I] is 2 or 4. From the same viewpoint, tetra-n-butyl polytitanate is more preferable, and tetra-n-butyltitanium dimer or tetra-n-butyltitanium tetramer is particularly preferable.

Examples of a process for producing the titanium compound represented by the above formula (4) are a process comprising the step of reacting a predetermined amount of $Ti(OR^2)_4$ with a predetermined amount of $TiX^3_4$, and a process comprising the step of reacting a predetermined amount of $TiX^3_4$ with a predetermined amount of a corresponding alcohol such as $R^2OH$.

Examples of the organomagnesium compound used in the present invention are those having a magnesium-carbon bond. Particularly preferable examples thereof are a Grignard compound represented by the following formula (5), and a dihydrocarbyl magnesium compound represented by the following formula (6).

$$R^{16}MgX^5 \qquad (5)$$

$$R^{17}R^{18}Mg \qquad (6)$$

In these formulas, Mg is a magnesium atom, $R^{16}$ is a hydrocarbon group having 1 to 20 carbon atoms, $R^{17}$ and $R^{18}$ are independently of each other a hydrocarbon group having 1 to 20 carbon atoms, $X^5$ is a halogen atom, and $R^{17}$ and $R^{18}$ may be the same or different from each other.

Examples of $R^{16}$ to $R^{18}$ are alkyl, aryl, aralkyl and alkenyl groups having 1 to 20 carbon atoms such as methyl, ethyl, propyl, i-propyl, butyl, sec-butyl, tert-butyl, i-amyl, hexyl, octyl, 2-ethylhexyl, phenyl and benzyl groups. It is particularly recommendable to use the Grignard compound represented by the above formula (5) in the form of an ether solution thereof from a viewpoint of polymerization activity of a catalyst obtained.

It is permitted to use the organomagnesium compound in combination with an organometallic compound to form a hydrocarbon soluble complex. Examples of the organometallic compounds are compounds of Li, Be, B, Al and Zn.

The inorganic fine particle used in the present invention means an inorganic substance having a volume average diameter of preferably 0.1 nm to 1 mm, which is measured by a method mentioned hereinafter.

The above-mentioned inorganic substance may be known in the art, such as metals, ceramics, alloys, cermets and amorphous alloys. Specific examples of the inorganic substance are metals of single substances such as Mg, V, Sr, Pb, Ag, Au, Al, Ga, Ti, W, Fe, Co, Ni, Zn, Cd, P, As, Sb, Bi, Pt and rare earth metals; halides of said metals such as fluorides, chlorides, bromides and iodides; oxides of said metals; chalcogen compounds of said metals such as sulfides; nitrides of said metals; phosphides of said metals; arsenides of said metals; carbides of said metals; silicides of said metals; borides of said metals; hydroxides of said metals; carbonates of said metals; sulfates of said metals; nitrates of said metals; silicates of said metals, phosphates of said metals; chlorites of said metals; chlorates of said metals; and perclorates of said metals. The inorganic substance may contain at least two metal elements. These inorganic substances are described in detail in "Encyclopedia of Experimental Chemistry, Volume 6, Inorganic Compounds, 4th edition" (1993, Maruzen Co., Ltd.).

Among them, a layered inorganic substance is preferably used as the above-mentioned inorganic substance. Specific examples thereof are single substances such as graphite, black phosphorus, arsenic, antimony and bismuth; metal halides such as $MgBr_2$, $CdI_2$, $AsI_3$, $VI_3$, $SrFCl$, $PbFI$ and $Ag_2F$; metal hydroxides such as $Mg(OH)_2$, $Ca(OH)_2$, $Al(OH)_3$, $Mn(OH)_2$ and $Fe(OH)_2$; transitional metal chalcogenides such as $HfS_2$, $MoS_2$, $NiTe_2$, $PtSe_2$ and $ZrS_2$; 13–16 group compounds such as GaS, GaSe, GaTe and InSe; 14–16 group compounds such as PbO, $Ge_2Te_3$, SnO, $SnS_2$ and $SnSe_2$; layered complex hydroxides such as $Mg_6Al_2(OH)_{16}CO_3 \cdot nH_2O$ (hydrotalcite) and $Zn_6Al_2(OH)_{16}CO_3 \cdot nH_2O$; layered silicate compounds; high temperature superconductors comprising copper oxides; organic conductors comprising charge transfer complexes; organic superconductors; boron nitride (BN); layered titanates; and metal phosphates such as zirconium phosphate. Of these, layered silicate compounds are particularly preferred.

The above-mentioned "layered silicate compound" generally means a layer structure-carrying crystal, which is composed of an overlap of (i) a two-dimensional sheet like material, wherein $SiO_4$ tetrahedrons are connected with one another at their three vertexes, and (ii) an ion such as an aluminum ion, a magnesium ion and an iron ion. The layered silicate compound is generally called a clay mineral, and is a compound belonging to a phillosilicate.

Specific examples of the layered silicate compound are a kaolin group such as dickite, nacrite, kaolinite, anauxite, metahalloysite and halloysite; a serpentine group such as chrysotile, lizardite and antigorite; a smectites group such as montmorillonite, sauconite, beidellite, nontronite, saponite, bentonite, hectorite and stevensite; a vermiculite group such as vermiculite; a mica group such as illite, sericite and glauconite; attapulgite; sepiolite; palygorskite; pyrophyllite; talc; and a chlorite group. These may form a mixed layer or may be a natural product or a synthetic product.

Of these, preferred are those exhibiting swelling property, and more preferred are layered silicate compounds such as the smectites group including montmorillonite, sauconite, beidellite, nontronite, saponite, hectorite, stevensite, bentonite and taeniolite, the vermiculite group and the mica group.

From a viewpoint of facility of dispersion and/or swelling of the layered silicate compound in an organic solvent, much more preferred is the smectites group which has been subjected to lipophilic treatment. Examples of said organic solvent are aliphatic hydrocarbons such as hexane and heptane and aromatic hydrocarbons such as toluene and xylene.

The above-mentioned "lipophilic treatment" means an exchange of a cation adsorbed on a surface of the smectites group with an organic cation. More specifically, almost all of the smectites group have a negative charge on their surfaces, and a cation is adsorbed on the surface to neutralize said negative charge. Accordingly, when such smectites group is contacted with a solution containing an organic cation different from the cation adsorbed thereon, an exchange reaction between the adsorbed cation and the organic cation in the solution occurs in a moment. As a result, the smectites group having an affinity to an organic substance, namely, the smectites group subjected to lipophilic treatment can be obtained.

Examples of the above-mentioned organic cation are ions such as an organic ammonium ion and an organic complex ion. Of these, particularly preferred is a quaternary ammonium ion.

An example of a process for the lipophilic treatment of the smectites group is a process which comprises the steps of (1) dispersing a purified smectites group in water, (2) adding a solution containing an organic ion thereto, and (3) dehydrating and drying precipitates produced.

In order to avoid unfavorable effects owing to impurities such as water adsorbed on the inorganic fine particle or active hydrogen-carrying groups such as hydroxyl group present on the surface of said inorganic fine particle, it is recommendable to use an inorganic fine particle treated with a compound such as an organic magnesium compound and an organic aluminum compound, which magnesium or aluminum compound has a high reactivity to water or the hydroxyl group. An example of a process for such treating is a process which comprises the steps of (1) mixing about 1 to 10 mmol of an organic magnesium compound or an organic aluminum compound, 1 g of the inorganic fine particle and an organic solvent, and (2) stirring the mixture for about 1 hour at ambient temperature.

Examples of the ester compound are esters of mono-carboxylic acid and esters of poly-carboxylic acid. As the ester compound, for example, saturated aliphatic carboxylic acid esters, unsaturated aliphatic carboxylic acid esters, alicyclic carboxylic acid esters and aromatic carboxylic acid esters can be enumerated.

Specific examples of the ester compounds are methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-n-octyl phthalate and diphenyl phthalate.

Among these ester compounds, unsaturated aliphatic carboxylic acid esters such as methacrylic acid esters and maleic acid esters, and aromatic carboxylic acid esters such as phthalic acid esters are preferred. Dialkyl phthalates are particularly preferred.

It is preferable to use the titanium compound, organosilicone compound, inorganic fine particle and ester compound which are dissolved, diluted or swollen in or with a solvent. Examples of the solvent are aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, diisoamyl ether and tetrahydrofuran. Of these, preferred is a solvent capable of swelling the inorganic fine particle, which solvent is also preferred as a solvent for components other than the inorganic fine particle. A particularly preferred solvent is toluene.

A temperature of the reduction reaction for producing the solid product is usually from −50 to 70° C., preferably from −30 to 50° C., and particularly preferably from −25 to 35° C. A time required for the reduction reaction is not particularly limited, and it is usually from about 30 minutes to about 6 hours. After the reaction is carried out at the above-mentioned temperature, it is permitted to further carry out a post-reaction at a temperature of from 20 to 120° C.

The organosilicon compound is used in an amount of usually from 1 to 500, preferably from 1 to 300, and particularly preferably from 3 to 100 in terms of an atomic ratio, Si/Ti, i.e. a ratio of a silicon atom in the organosilicon compound to a titanium atom in the titanium compound.

The organomagnesium compound is used in an amount of usually from 0.1 to 10, preferably from 0.2 to 5.0, and particularly preferably from 0.5 to 2.0 in terms of an atomic ratio, (Ti+Si)/Mg, i.e. a ratio of the sum of a titanium atom in the titanium compound and a silicon atom in the organosilicon compound to a magnesium atom in the organomagnesium compound.

The titanium compound, organosilicon compound and organomagnesium compound may be used in an amount of from 1 to 51, preferably 2 to 31, and particularly preferably 4 to 26 in terms of an atomic molar ratio, Mg/Ti, in the solid catalyst component obtained.

An amount of the inorganic fine particle used is from 0.05 to 10000 g/mmol, preferably from 0.1 to 5000 g/mmol, and more preferably from 0.5 to 2000 g/mmol, in terms of a weight (g) per mmol of a titanium atom in the titanium compound.

The ester compound is used in an amount of usually from 0.5 to 100, preferably from 1 to 60, and particularly preferably from 2 to 30 in terms of a molar ratio, ester compound/Ti, i.e. a ratio of the ester compound to a titanium atom in the titanium compound.

The solid product obtained by the reduction reaction is usually separated by solid-liquid separation, and washed several times with an inert hydrocarbon solvent such as hexane, heptane and toluene.

The halogenation ability-carrying halogeno compound may be any compound capable of haloganating the solid product. Preferred examples of said compound are organic acid halides, halogeno compounds of the 4 group element and halogeno compounds of the 13 or 14 group element.

A preferable organic acid halide mentioned above is mono- or poly-carboxylic acid halides. Examples of said halides are aliphatic carboxylic acid halides, alicyclic carboxylic acid halides and aromatic carboxylic acid halides. Specific examples of the organic acid halide are acetyl chloride, propionic chloride, butyric chloride, valeric chloride, acrylic chloride, methacrylic chloride, benzoic chloride, toluic chloride, anisic chloride, succinic chloride, malonic chloride, maleic chloride, itaconic chloride and phthalic chloride. Of these, aromatic carboxylic acid chlorides such as benzoic chloride, toluic chloride and phthalic chloride are preferred. Aromatic dicarboxylic acid dichlorides are more preferred, and phthalic chloride is particularly preferred.

As the above-mentioned halogeno-compound (halogen-containing compound) of an element belonging to the 4 group of elements in the periodic table of the elements, those of titanium are preferable, and a titanium compound represented by the following formula (7) is more preferable.

$$Ti(OR^9)_b X^4_{4-b} \tag{7}$$

Examples of the group $R^9$ in the above formula (7) are alkyl groups such as methyl, ethyl, propyl, i-propyl, butyl, i-butyl, tert-butyl, amyl, i-amyl, tert-amyl, hexyl, heptyl octyl, decyl and dodecyl groups; aryl groups such as phenyl, cresyl, xylyl and naphthyl groups; allyl group such as propenyl; and aralkyl groups such as a benzyl group. Among these $R^9$, alkyl groups having 2 to 18 carbon atoms and aryl groups having 6 to 18 carbon atoms are preferable, and linear alkyl groups having 2 to 18 carbon atoms are particularly preferred.

As $X^4$ in the above formula (7), a chlorine atom, a bromine atom and an iodine atom are exemplified. Of these, a chlorine atom is particularly preferable.

A number of "b" in the above formula (7) satisfies $0 \leq b < 4$, preferably $0 \leq b \leq 2$, and particularly preferably $b=0$.

Specific examples of the titanium compound represented by the above formula (7) are titanium tetrahalides such as titanium tetrachloride, titanium tetrabromide and titanium tetraiodide; hydrocarbyloxytitanium trihalides such as methoxytitanium trichloride, ethoxytitanium trichloride, butoxytitanium trichloride, phenoxytitanium trichloride and ethoxytitanium tribromide; and dihydrocarbyloxytitanium dihalides such as dimethoxytitanium dichloride, diethoxytitanium dichloride, dibutoxytitanium dichloride, diphenoxytitanium dichloride, and diethoxytitanium dibromide. Among these titanium compounds, the most preferred is titanium tetrachloride.

The "halogeno compound of the 13 or 14 group element" means a compound having at least one 13 group element-halogen bond, or a compound having at least one 14 group element-halogen bond. Preferred is a compound represented by the following formula (8). In the formula, M is an atom of the group 13 or 14, $R^{27}$ is a hydrocarbon group having 1 to 20 carbon atoms, $X^6$ is a halogen atom, m is a valency of M and n is a number satisfying $0 < n \leq m$.

$$MR^{27}_{m-n} X^6_n \tag{8}$$

Examples of the above-mentioned 13 group atom are B, Al, Ga, In and Tl. Of these, preferred are B and Al, and more preferred is Al. Examples of the above-mentioned 14 group atom are C, Si, Ge, Sn and Pb. Of these, preferred are Si, Ge and Sn. As M, the 14 group atom is particularly preferred and Si is most preferred.

When M is Si in the above formula (8), the symbol "m" is 4, and the symbol "n" is preferably 3 or 4. Examples of $X^6$ are F, Cl, Br and I. Of these, preferred is Cl.

Examples of $R^{27}$ in the above formula (8) are alkyl groups such as methyl, ethyl, n-propyl, i-propyl, n-butyl, i-butyl, amyl, i-amyl, hexyl, heptyl, octyl, decyl and dodecyl groups; aryl groups such as phenyl, tolyl, cresyl, xylyl and naphthyl groups; cycloalkyl groups such as cyclohexyl and cyclopentyl groups; allyl groups such as propenyl group; and aralkyl groups such as benzyl group. Of these, preferred are alkyl and aryl groups and particularly preferred are methyl, ethyl, n-propyl, phenyl and p-tolyl groups.

Specific examples of the halogeno compounds of the 13 group element are trichloroboron, methyldichloroboron, ethyldichloroboron, phenyldichloroboron, cyclohexyldichloroboron, dimethylchloroboron, methylethylchloroboron, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methyldichlorogallium, ethyldichlorogallium, phenyldichlorogallium, cyclohexyldichlorogallium, dimethylchlorogallium, methylethylchlorogallium, indium chloride, indium trichloride, methylindium dichloride, phenylindium dichloride, dimethylindium chloride, thallium chloride, thallium trichloride, methylthallium dichloride, phenylthallium dichloride, dimethylthallium chloride and those named by replacing the chloro in the above mentioned compounds with fluoro, bromo or iodo, respectively.

Specific examples of the hologeno compounds of the 14 group element are tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, di-i-butyldichlorotin, diphenyldichlorotin, divinyldichlorotin, methyltrichlorotin, phenyltrichlorotin, dichlorolead, methylchlorolead, phenylchlorolead, dichlorolead, methylchlorolead, phenylchlorolead and those named by replacing the chloro in the above-mentioned compounds with fluoro, bromo or iodo, respectively.

From a viewpoint of polymerization activity of the catalyst obtained, particularly preferred are tetrachlorosilane, phenyltrichlorosilane, methyltrichlorosilane, ethyltrichlorosilane, n-propyltrichlorosilane and p-tolyltrichlorosilane as the halogeno compound of the 13 or 14 group compound.

The term "inner electron donor compound" used in the present invention means an electron donor compound used in a process for producing a solid catalyst component for an olefin polymerization. Examples of the electron donor compound are oxygen-containing compounds such as ethers (including diethers), ketones, aldehydes, carboxylic acids, organic acid esters, inorganic acid esters, organic acid amides, inorganic acid amides and acid anhydrides; and nitrogen-containing compounds such as ammonia, amines, nitriles and isocyanates. Of these, organic acid esters or ethers are preferred, and carboxylic acid esters or ethers are more preferred.

As the carboxylic acid esters, mono-carboxylic acid esters and poly-carboxylic acid esters can be exemplified. More specifically, saturated aliphatic carboxylic acid esters, unsaturated aliphatic carboxylic acid esters, alicyclic carboxylic acid esters and aromatic carboxylic acid esters can be exemplified. More specifically, methyl acetate, ethyl acetate, phenyl acetate, methyl propionate, ethyl propionate, ethyl butyrate, ethyl valerate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutylmaleate, diethylitaconate, dibutylitaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-n-octyl phthalate and diphenyl phthalate can be exemplified. Among these, unsaturated aliphatic carboxylic acid esters such as methacrylic acid esters and maleic acid esters, and aromatic carboxylic acid esters such as benzoic acid esters and phthalic acid esters are preferred, and aromatic polycarboxylic acid esters are particularly preferred. Of these, dialkyl phthalates are most preferred.

As the ether, dialkyl ethers and diether compounds represented by the following formula can be exemplified.

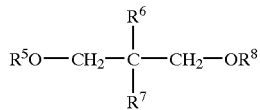

In the above formula, $R^5$ to $R^8$ are independently of one another a linear or branched-chain or alicyclic alkyl group having 1 to 20 carbon atoms; an aryl group; or an aralkyl group, provided that $R^6$ and $R^7$ may be independently of each other a hydrogen atom.

Examples of the ether are dimethyl ether, diethyl ether, di-n-butyl ether, methyl ethyl ether, methyl n-butyl ether, methyl cyclohexyl ether, 2,2-di-i-butyl-1,3-dimethoxypropane, 2-i-propyl-2-i-pentyl-1,3-dimethoxypropane, 2,2-bis(cyclohexylmethyl)-1,3-dimethoxypropane, 2-i-propyl-2-3,7-dimethyloctyl-1,3-dimethoxypropane, 2,2-di-i-propyl-1,3-dimethoxypropane, 2-i-propyl-2-cyclohexylmethyl-1,3-dimethoxypropane, 2,2-dicyclohexyl-1,3-dimethoxypropane, 2-i-propyl-2-i-butyl-1,3-dimethoxypropane, 2,2-di-i-propyl-1,3-dimethoxypropane, 2,2-di-propyl-1,3-dimethoxypropane, 2-i-propyl-2-cyclohexyl-1,3-dimethoxypropane, 2-i-propyl-2-cyclopentyl-1,3-dimethoxypropane, 2,2-di-cyclopentyl-1,3-dimethoxypropane and 2-heptyl-2-pentyl-1,3-dimethoxypropane. Two or more thereof can be used in combination.

Among above-mentioned ethers, the dialkyl ether is particularly preferable, and di-n-butyl ether (hereinafter, referred to as "dibutyl ether" or "butyl ether") is the most preferable.

A method for contacting components in a process for producing the solid catalyst component in accordance with the present invention is not limited, and said method may be any method known in the art. Examples of the method are a slurry method and a mechanical pulverization method using a ball mill. However, the latter method is not recommendable from an industrial point of view, because a lot of fine powders may be produced to make a particle size distribution of the solid catalyst component obtained broad. Therefore, it is recommendable to carry out the contact in the presence of a diluent. The contact may be repeated more than two times.

A solid catalyst component in a reaction mixture obtained in a step of the above-mentioned contacting is usually separated by a solid-liquid separation. The solid catalyst component separated can be used as they are for producing a polymerization catalyst. However, it is recommendable to wash the solid catalyst component with a diluent, which is inert to the solid catalyst component, in order to remove unnecessaries contained in the solid catalyst component.

Examples of the above-mentioned diluent are aliphatic hydrocarbons such as pentane, hexane, heptane and octane; aromatic hydrocarbons such as benzene, toluene and xylene; alicyclic hydrocarbons such as cyclohexane and cyclopentane; and halogenated hydrocarbons such as 1,2-dichloroethane and monochlorobenzene.

When the diluent is used during the above-mentioned contact, an amount of the diluent used per contact is usually from 0.1 ml to 1000 ml, and preferably from 1 ml to 100 ml per g of the solid product. When the diluent is used for the washing as mentioned above, an amount thereof per washing is similar to that in the contact. The washing is carried out usually from 1 to 5 times per contact.

The contact and washing can be carried out usually at a temperature of from −50 to 150° C., preferably from 0 to 140° C., and more preferably from 60 to 135° C. A time for the contact is not particularly limited. It is preferably from 0.5 to 8 hours, and more preferably from 1 to 6 hours. Also, a time for the washing is not particularly limited. It is preferably from 1 to 120 minutes, and more preferably from 2 to 60 minutes.

The halogenation ability-carrying halogeno compound is used in an amount of usually from 1 to 2000 mol, preferably from 5 to 1000 mol, and more preferably from 10 to 800 mol per mol of the titanium atom contained in the solid product.

The inner electron donor compound is used in an amount of usually from 0.1 to 50 mol, preferably from 0.3 to 30 mol, and more preferably from 0.5 to 20 mol per mol of the titanium atom in the solid product.

In the case that the contact is carried out more than one time, or in the case that more than one kind of the halogenation ability-carrying halogeno compound or more than one kind of the inner electron donor compound are used in each contact, the above-mentioned amount of the halogenation ability-carrying halogeno compound, and that of the inner electron donor compound mean the amount per one contact or per one kind of said compound.

The solid catalyst component obtained by the step of solid-liquid separating is usually washed several times with an inert hydrocarbon solvent such as hexane and heptane, and then used for producing an olefin polymerization catalyst. From a viewpoint of polymerization activity and stereospecific polymerization ability of the catalyst obtained, it is recommendable that the solid catalyst component obtained by the solid-liquid separation is washed at a temperature of 50 to 120° C. at least one time with a large amount of a halogenized hydrocarbon solvent such as monochlorobenzene or an aromatic hydrocarbon solvent such as toluene, successively washed several times with an aliphatic hydrocarbon solvent such as hexane, and then used for producing the olefin polymerization catalyst.

The "organoaluminum compound" used in the process for producing the olefin polymerization catalyst in accordance with the present invention means a compound having at least one Al-carbon bond in the molecule. Typical examples thereof are those represented by the following formulas (9) and (10).

$$R^{19}{}_{w}AlY_{3-w} \qquad (9)$$

$$R^{20}R^{21}Al—O—AlR^{22}R^{23} \qquad (10)$$

wherein $R^{19}$ to $R^{23}$ are independently of one another a hydrocarbon group having 1 to 20 carbon atoms; Y is a halogen atom, a hydrogen atom or an alkoxy group; and w is a number satisfying $2 \leq w \leq 3$.

Specific examples of said compound are trialkylaluminums such as triethylaluminum, tri-i-butylaluminum and trihexylaluminum; dialkylaluminum hydrides such as diethylaluminum hydride and di-i-butylaluminum hydride; dialkylaluminum halides such as diethylaluminum chloride; mixtures of trialkylaluminums and dialkylaluminum halides such as a mixture of triethylaluminum and diethylaluminum chloride; and alkylalumoxanes such as tetraethyldialumoxane and tetrabutyldialumoxane.

Among these, trialkylaluminums, mixtures of trialkylaluminums and dialkylaluminum halides and alkylalumoxanes are preferred. Triethylaluminum, tri-i-butylaluminum, a mixture of triethylaluminum and diethylaluminum chloride, and tetraethyldialumoxane are particularly preferred.

The "outer electron donor compound" used in the present invention means an electron donor compound used for the process for producing the olefin polymerization catalyst in accordance with the present invention. As the outer electron donor compound, for example, oxygen-containing electron donor compounds such as ethers including diethers, ketones, aldehydes, carboxylic acids, organic acid esters, inorganic acid esters, organic acid amides, inorganic acid amides and acid anhydrides; and nitrogen-containing electron donor compounds such as ammonia, amines, nitriles and isocyanates are enumerated. Of these, inorganic acid esters and diethers are preferred, and alkoxysilicon compuds represented by the following formula (11) are more preferred, $$R^{3}{}_{r}Si(OR^{4})_{4-r} \qquad (11)$$

wherein $R^3$ is a hydrocarbon group having 1 to 20 carbon atoms or a hydrogen atom; $R^4$ is a hydrocarbon atoms having 1 to 20 carbon atoms; and r is a number satisfying $0 \leq r < 4$. All of R3 and all of $R^4$ are the same or different from one another, respectively.

Particularly preferred electron donor compounds are alkoxysilicon compounds represented by the following formula (12), $$R^{24}R^{25}Si(OR^{26})_{2} \qquad (12)$$

wherein $R^{24}$ is a $C_{3-20}$ hydrocarbon group, whose carbon atom adjacent to Si is secondary or tertiary; $R^{25}$ is a $C_{1-20}$ hydrocarbon group; and $R^{26}$ is a $C_{1-20}$ hydrocarbon group and preferably a $C_{1-5}$ hydrocarbon group.

As $R^{24}$, for example, branched chain alkyl groups such as isopropyl, sec-butyl, tert-butyl and tert-amyl groups; cycloalkyl groups such as cyclobutyl, cyclopentyl and cyclohexyl groups; cycloalkenyl groups such as a cyclopentenyl group; and aryl groups such as pheny and tolyl groups are enumerated.

As $R^{25}$, for example, linear alkyl groups such as methyl, ethyl, propyl, butyl and pentyl groups; branched chain alkyl groups such as isopropyl, sec-butyl, tert-butyl and tert-amyl groups; cycloalkyl groups such as cyclopentyl and cyclohexyl groups; cycloalkenyl groups such as a cyclopentenyl group; and aryl groups such as pheny and tolyl groups are enumerated.

Specific examples of the above-mentioned alkoxysilicon compounds are di-i-propyldimethoxysilane, di-i-butyldimethoxysilane, di-tert-butyldimethoxysilane, tert-butylmethyldimethoxysilane, tert-butylethyldimethoxysilane, tert-butyl-n-ptropyldimethoxysilane, tert-butyl-n-butyldimethoxysilane, tert-amylmethyldimethoxysilane, tert-amylethyldimethoxysilane, tert-amyl-n-propyldimethoxysilane, tert-amyl-n-butyldimethoxysilane, i-butyl-i-propyl-dimethoxysilane, tert-butyl-i-propyldimethoxysilane, dicyclobutyldimethoxysilane, cyclobutyl-i-propyldimethoxysilane, cyclobutyl-i-butyldimethoxysilane, cyclobutyl-tert-butyldimethoxysilane, dicyclopentyldimethoxysilane, cyclopentyl-i-propyldimethoxysilane, cyclopentyl-i-butyldimethoxysilane, cyclopentyl-tert-butyldimethoxysilane, dicylohexyldimethoxysilane, cyclohexylmethyldimethoxysilane, cyclohexylethyldimethoxysilane, cyclohexyl-i-propyldimethoxysilane, cyclohexyl-i-butyldimethoxysilane, cyclohexyl-tert-butyldimethoxysilane, cyclohexylcyclopentyldimethoxysilane, cyclohexylphenyldimethoxysilane, diphenyldimethoxysilane, phenymethyldimethoxysilane, phenyl-i-propyldimethoxysilane, phenyl-i-butyldimethoxysilane, phenyl-tert-butyldimethoxysilane, phenylcyclopentyldimethoxysilane, di-i-propyldiethoxysilane, di-i-butyldiethoxysilane, di-tert-butyldiethoxysilane, tert-butylmethyldiethoxysilane, tert-butylethyldiethoxysilane, tert-butyl-n-propyldiethoxysilane, tert-butyl-n-butyldiethoxysilane, tert-amylmethyldiethoxysilane, tert-amylethyldiethoxysilane, tert-amyl-n-propyldiethoxysilane, tert-amyl-n-butyldiethoxysilane, dicyclopentyldiethoxysilane, dicyclohexyldiethoxysilane, cycohexylmethyldiethoxysilane, cyclohexylethyldiethoxysilane, diphenyldiethoxysilane, phenylmethyldiethoxysilane and 2-norbornanemethyldiethoxysilane.

The term "contacting" in the process for producing the catalyst for olefin polymerization in accordance with the present invention means a step, which can form the catalyst for olefin polymerization by interaction among the solid catalyst component, the organoaluminum compound and the outer electron donor compound. Examples of said contacting are (1) mixing the above-mentioned three components, (2) diluting each of said three components with a solvent to obtain respective solutions and mixing them, and (3) supplying separately said three components in a polymerization zone. In supplying said three components each in the polymerization zone, or in supplying the catalyst in the polymerization zone, it is recommendable to supply them under a water free condition in an atmosphere of an inert gas such as nitrogen or argon.

The catalyst for olefin polymerization, which is used in the process for producing the olefin polymer in accordance with the present invention, may be a catalyst obtained by contacting the above-mentioned three components, or may be a catalyst obtained by contacting (1) a pre-polymerized solid catalyst component mentioned below, (2) the organoaluminum compound and (3) the outer electron donor compound.

The above-mentioned "pre-polymerized solid catalyst component" means a solid catalyst component obtained by polymerizing a small amount of an olefin in the presence of the above-mentioned solid catalyst component, the organoaluminum compound and, if necessary, the outer electron donor compound. It is recommendable to polymerize the olefin in a slurry state. Examples of a solvent used for obtaining the slurry are inert hydrocarbons such as propane, butane, isobutane, pentane, isopentane, hexane, heptane, octane, cyclohexane, benzen and toluene. A partial or total amount of the inert hydrocarbon solvent may be replaced with a liquid olefin.

In the pre-polymerization, the organoaluminum compound is used in an amount of usually from 0.5 to 700 mol, preferably from 0.8 to 500 mol, and particularly preferably from 1 to 200 mol per mol of the titanium atom in the solid catalyst component.

A concentration of the slurry in the pre-polymerization is preferably from 1 to 500 g-solid catalyst component/liter-solvent, and particularly preferably from 3 to 300 g-solid catalyst component/liter-solvent. A pre-polymerization temperature is preferably from −20 to 100° C., and particularly preferably from 0 to 80° C. A partial pressure of the olefin in the gas phase portion during the pre-polymerization is preferably from 0.01 to 20 kg/cm$^2$, and particularly preferably from 0.1 to 10 kg/cm$^2$, but the olefin which is liquid at that pressure and temperature for the pre-polymerization is not limited thereto. A time for the pre-polymerization is not particularly limited, and it is usually preferably from 2 minutes to 15 hours.

Examples of a process for contacting respective components in the pre-polymerization are (1) a process comprising the steps of contacting the solid catalyst component with the organoaluminum compound, and further contacting with the olefin, and (2) a process comprising the steps of contacting the solid catalyst component with the olefin, and further contacting with the organoaluminum compound.

Examples of a process for supplying the olefin in the pre-polymerization are (1) a process comprising the step of supplying a pre-determined amount of the olefin successively in the polymerization zone while retaining an inner pressure of the polymerization zone to a pre-determined degree, and (2) a process comprising the step of supplying the pre-determined total amount of the olefin in the polymerization zone at the beginning. In order to regulate a molecular weight of the polymer obtained in the pre-polymerization, a chain transfer agent such as hydrogen may be used.

If desired, a part or the total amount of the above-mentioned electron donor compound may be used in the pre-polymerization. The electron donor compound is used in an amount of usually from 0.01 to 400 mol, preferably from 0.02 to 200 mol, and particularly preferably from 0.03 to 100 mol per mol of the titanium atom in the solid catalyst component, and usually from 0.003 to 5 mol, preferably from 0.005 to 3 mol, and particularly preferably from 0.01 to 2 mol per mol of the organoaluminum compound.

How to supply the electron donor compound to a polymerization reactor in the pre-polymerization is not particularly limited. It is permitted to supply the electron donor compound independently from the organoaluminum compound, or contact both in advance and then supply the resulting product. The olefin used in the pre-polymerization may be the same as or different from that used in the real polymerization.

The "olefin" used in the process for producing an olefin polymer in accordance with the present invention means that having not less than 2 carbon atoms. Examples of the olefin are linear monolefin such as ethylene, propylene, butene-1, pentene-1, hexene-1, heptene-1, octene-1 and decene-1; branched chain monolefin such as 3-methylbutene-1, 3-methylpentene-1 and 4-methylpenetene-1; and vinylcyclohexane. The olefin may be used each alone or in a mixture of two or more.

In the process for producing an olefin polymer in accordance with the present invention, it is preferred to polymerize ethylene or α-olefin, and more preferred to copolymerize a mixed olefin containing ethylene or propylene or butene-1 as a main component.

As an olefin polymer obtained by the process for producing an olefin polymer in accordance with the present invention, propylene polymers having a polypropylene crystal structure are particularly preferable. Among them, homopolymers of propylene and copolymers of a mixed olefin containing propylene as a main component are particularly preferable.

In the process for producing an olefin polymer in accordance with the present invention, it is permitted to use a mixture of ethylene and at least one olefin selected from the above-mentioned α-olefins. Further, it is permitted to additionally use, as a comonomer, a compound having several unsaturated bonds such as a conjugated diene and a non-conjugated diene. With respect to a polymerization method, it is also possible to carry out a hetero-block copolymerization, in which the polymerization is carried out.

In the real polymerization, the organoaluminum compound is used in an amount of usually from 1 to 1000 mol, and particularly preferably from 5 to 600 mol per mol of the titanium atom in the solid catalyst component.

In the real polymerization, the outer electron donor compound is used in an amount of usually from 0.1 to 2000 mol, preferably from 0.3 to 1000 mol, and particularly preferably from 0.5 to 800 mol per mol of the titanium atom in the solid catalyst component, and usually from 0.001 to 5 mol, preferably from 0.005 to 3 mol, and particularly preferably from 0.01 to 1 mole per mol of the organoaluminum compound.

A temperature of the real polymerization is usually from −30 to 300° C., and preferably from 20 to 180° C. A polymerization pressure is not particularly limited, and from an industrial and economical point of view, it is usually from atmospheric pressure to 100 kg/cm$^2$, and preferably from about 2 to 50 kg/cm$^2$. The polymerization may be carried out in either a batch-wise manner or a continuous manner according to a slurry or solution polymerization method, wherein an inert hydrocarbon solvent such as propane, butane, isobutane, pentane, hexane, heptane and octane is used, or a bulk polymerization method, wherein an olefin which is liquid at that polymerization temperature is used as a medium, or a gas phase polymerization method. It is permitted to use a chain transfer agent such as hydrogen in order to regulate a molecular weight of the polymer obtained.

According to the present invention, a particulate inorganic substance can be fully dispersed in an olefin polymer, and owing to said superior dispersion, an olefin polymer having superior properties can be produced. Since the catalyst for olefin polymerization obtained in accordance with the present invention has a high polymerization activity per transition metal atom, the process for producing an olefin polymer in accordance with the present invention is a very effective process.

EXAMPLE

The present invention is explained in more detail with reference to the following Examples, which are only illustrative and not intended to limit the scope of the present invention.

Physical properties of the polymer were measured in the following manners.

1. Intrinsic Viscosity ($[\eta]$(dl/g))

Measured in a tetraline solvent at 135° C. using an Ubbellohde viscometer.

2. Dispersion State of Layered Silicate Compound

Dispersion state of a layered silicate compound in a polymer was observed according to a method comprising the steps of:

(1) embedding a particulate polymer powder in an epoxy resin to prepare a test piece, (2) cooling the test piece to −80° C., (3) cutting the cooled test piece with a microtome to obtain a very thin flake having a thickness of about 0.1 μm, and (4) observing a dispersion state of the layered silicate compound in the very thin flake at 120,000 magnification using a transmission electron microscope (Type H-8000) manufactured by Hitachi, Ltd.

3. Storage Modulus (E') (GPa)

It was measured according to a method comprising the steps of:

(1) compression-molding a polymer at 230° C. to obtain a sheet having a thickness of 0.3 mm, (2) cutting the sheet to obtain a test piece having a size of 3 mm×20 mm, and (3) measuring a storage modulus thereof at a temperature of −150 to 150° C. and at a frequency of 5 Hz using an apparatus, a trade name of EXSTER 6000, manufactured by Seiko Instruments Inc.

4. Volume Average Diameter

A volume average diameter of an inorganic fine particle was measured by a method comprising the steps of:

(1) suspending about 1 g of a sample in a water/ethanol mixture (equal volume) to obtain a suspension, (2) irradiating the suspension with ultrasound for 5 minutes using an ultrasonic homogenizer installed in the below-mentioned laser scattering type-particle size distribution analyzer, and (3) measuring a volume average diameter under dispersing with power of 40 W for 5 minutes using the laser scattering type-particle size distribution analyzer, a trade name of MICROTRAC HRA9320-X100, manufactured by LEED & NORTHRUP.

Example 1

(1) Production of Solid Product

A 300 ml flask equipped with a stirrer and a dropping funnel was purged with nitrogen, and thereafter 11.0 g of a lipophilic smectite (volume average diameter=70.9 μm) fully dried, a trade name of STN, manufactured by Co-op Chemical Co., Ltd., 27.4 ml of di-n-butyl ether and 27.4 ml of a di-n-butyl ether solution having a n-butylmagnesium chloride concentration of 2.1 mmol/ml, manufactured by Yuki Gosei Kogyo Co., Ltd., were fed therein and mixed, and the mixture was stirred for 1 hour at ambient temperature. After completion of stirring, the mixture was subjected to solid-liquid separation. The solid obtained was washed two times with each 18.3 ml of di-n-butyl ether and dried in vacuo, thereby obtaining a dehydrated smectite.

A 300 ml flask equipped with a stirrer and a dropping funnel was purged with nitrogen, and thereafter 11.6 g of the above dehydrated smectite, 57.8 ml of toluene, 0.8 ml (2.4 mmol) of tetrabutoxytitanium and 8.9 ml (39.8 mmol) of tetraethoxysilane were fed therein and mixed to obtain a slurry.

To the slurry, 20.0 ml of a di-n-butyl ether solution having a n-butylmagnesium chloride concentration of 2.1 mmol/ml, manufactured by Yuki Gosei Kogyo Co., Ltd. was gradually dropped over 15 minutes from the dropping funnel while keeping an inner temperature of the flask to 5° C. After completion of dropping, the mixture was further stirred for 45 minutes at 5° C., and successively further stirred for 45 minutes at 40° C. The reaction mixture was subjected to solid-liquid separation, and the solid obtained was washed two times with each 57.8 ml of toluene, thereby obtaining a solid product. To the solid product, 57.8 ml of toluene was added to obtain a slurry.

(2) Production of Solid Catalyst Component

The above-mentioned solid product slurry was heated to 95° C., and thereafter 4.1 ml (15.3 mmol) of diisobutyl phthalate was added thereto, followed by stirring, thereby obtaining a mixture. The mixture was subjected to solid-liquid separation at 95° C., and the solid obtained was washed at ambient temperature two times with each 57.9 ml of toluene.

To the solid washed, 57.9 ml of toluene was added, and thereafter a mixture of 3.4 ml (20.1 mmol) of di-n-butyl ether and 60.8 ml (554.4 mmol) of titanium tetrachloride was added thereto. The mixture was stirred for 3 hours at 95° C. The resulting reaction mixture was subjected to solid-liquid separation at 95° C., and the solid obtained was washed at 95° C. two times with each 57.9 ml of toluene.

To the solid washed, a mixture of 57.9 ml of toluene, 3.4 ml (20.1 mmol) of di-n-butyl ether and 60.8 ml (554.4 mmol) of titanium tetrachloride was added. The mixture was stirred for 1 hour at 95° C. The resulting reaction mixture was subjected to solid-liquid separation at 95° C., and the solid obtained was washed at 95° C. three times with each 57.9 ml of toluene, and successively washed at ambient temperature three times with each 57.9 ml of hexane. The solid washed was dried in vacuo, thereby obtaining 16.0 g of a solid catalyst component. The titanium atom content in the solid catalyst component was found to be 1.79% by weight.

(3) Polymerization of Propylene

A 3 liter agitation type stainless steel autoclave was purged with argon, and 1000 ml of heptane, 2.6 mmol of triethylaluminum, 0.26 mmol of tert-butyl-n-propyl-dimethoxysilane and 2.47 g of the above-mentioned solid catalyst component were fed therein. Thereafter, hydrogen in an amount corresponding to a partial pressure of 450 mmHg was added thereto. Successively, 100 g of liquefied propylene was fed therein, and thereafter temperature of the autoclave was raised to 60° C., and polymerization was continued for 5 minutes at 60° C. After completion of polymerization, the unreacted monomer was purged. The polymer obtained was dried in vacuo at 60° C. for 2 hours, thereby obtaining 87 g of polypropylene powder.

A yield of polypropylene per g of the solid catalyst component was found to be about 35 g/g (PP/cat=87/2.47≈35). A layered silicate compound content in the polypropylene was calculated from the weight of the layered silicate compound contained in the catalyst used, and the weight of the polymer obtained, and found to be 19000 ppm by weight. An intrinsic viscosity [η] and a storage modulus (E' at 23° C.) of the polymer were found to be 1.21 (dl/g) and 2.15 (GPa), respectively. It was confirmed that the layered silicate compound contained in the polymer was dispersed satisfactorily. The results are shown in Table 1.

Comparative Example 1
(1) Production of Solid Product

A 500 ml flask equipped with a stirrer and a dropping funnel was purged with argon, and thereafter 290 ml of hexane, 7.7 g (23 mmol) of tetrabutoxytitanium and 75.0 g (360 mmol) of tetraethoxysilane were fed therein and stirred to obtain a uniform solution. To the solution, 181 ml of a di-n-butyl ether solution having a n-butylmagnesium chloride concentration of 2.1 mmol/ml, manufactured by Yuki Gosei Kogyo Co., Ltd. was gradually dropped over 3.5 hours from the dropping funnel while keeping an inner temperature of the flask to 5° C. After completion of dropping, the mixture was further stirred for 1 hour at ambient temperature.

The reaction mixture obtained was subjected to solid-liquid separation at ambient temperature, and the solid obtained was washed three times with each 300 ml of hexane, and further washed three times with each 300 ml of toluene. To the solid washed, 300 ml of toluene was added to obtain a slurry having a solid product concentration of 0.125 g/ml.

From a composition analysis of a part of the slurry, a titanium atom content, ethoxy group content and butoxy group content in the solid product were found to be 2.1% by weight, 36.2% by weight and 3.8% by weight, respectively.
(2) Production of Solid Catalyst Component 125 Milliliters of a supernatant liquid of the above-mentioned solid product slurry were taken off and abandoned. To the remainder, 45.8 ml (171 mmol) of diisobutyl phthalate was added, followed by stirring for 30 minutes at 95° C. The mixture obtained was subjected to solid-liquid separation, and the solid obtained was washed two times with each 287 ml of toluene. To the solid washed in the flask, 74.5 ml of toluene, 2.9 ml (11 mmol) of diisobutyl phthalate, 6.3 ml (37 mmol) of butyl ether and 99 ml (0.90 mol) of titanium tetrachloride were added. The mixture was stirred for 3 hours at 100° C. The mixture was subjected to solid-liquid separation at 100° C., and the solid obtained was washed at 100° C. two times with each 287 ml of toluene. To the solid washed, 74.5 ml of toluene, 6.3 ml (37 mmol) of butyl ether and 50 ml (0.45 mol) of titanium tetrachloride were added. The mixture was stirred for 1 hour at 100° C. The resulting mixture was subjected to solid-liquid separation at 100° C., and the solid obtained was washed at 100° C. four times with each 287 ml of toluene, and successively washed three times with each 287 ml of hexane. The solid washed was dried in vacuo, thereby obtaining 46 g of a solid catalyst component.

The solid catalyst component was found to have a titanium atom content of 2.2% by weight, a phthalic acid ester content of 10.7% by weight, an ethoxy group content of 0.7% by weight and a butoxy group content of 0.3% by weight.
(3) Polymerization of Propylene A 3 liter agitation type stainless steel autoclave was purged with argon, and 1000 ml of heptane, 2.6 mmol of triethylaluminum, 0.26 mmol of tert-butyl-n-propyl-dimethoxysilane and 0.0943 g of the solid catalyst component obtained in the above (2) were fed therein. Thereafter, hydrogen in an amount corresponding to a partial pressure of 600 mmHg was added thereto. Successively, 100 g of liquefied propylene was fed therein, and thereafter temperature of the autoclave was raised to 60° C., and polymerization was continued for 30 minutes at 60° C. After completion of polymerization, the unreacted monomer was purged. The polymer obtained was dried in vacuo at 60° C. for 2 hours, thereby obtaining 264 g of polypropylene powder.

A yield of polypropylene per g of the solid catalyst component was found to be PP/cat=2800 (g/g). An intrinsic viscosity [η] and a storage modulus of the polymer were found to be 1.26 (dl/g) and 1.82 (GPa), respectively. The results are shown in Table 1.

Comparative Example 2

Polypropylene obtained in the above Comparative Example 1 and the same kind of a layered silicate as that used in the above Example 1 were kneaded at 190° C. for three minutes using a roll kneader to obtain a kneaded product, which had the silicate content of 1.9% by weight. It was confirmed that the layered silicate contained in the kneaded product was not dispersed satisfactorily. The results are shown in Table 1. An intrinsic viscosity [η] and a storage modulus of the kneaded product were found to be 1.26 (dl/g) and 1.88 (GPa), respectively. The results are shown in Table 1.

TABLE 1

|  | Example 1 | Comparative Example 1 | Comparative Example 2 |
|---|---|---|---|
| Intrinsic viscosity ([η])(dl/g) | 1.21 | 1.26 | 1.26 |
| Smectite content (% by weight) | 1.9 | 0 | 1.9 |
| Storage modulus at 23° C. (GPa) | 2.15 | 1.82 | 1.88 |

What is claimed is:

1. A process for producing a solid product, which comprises the step of reducing a titanium compound represented by the following formula [I] with an organomagnesium compound in the presence of an organosilicon compound having an Si—O bond and an inorganic fine particle a fine particle of a layered inorganic substance having a volume average particle diameter of 0.1 nm to 1 mm,

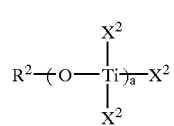

[I]

wherein "a" is a number of 1 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another.

2. A process for producing a solid product, which comprises the step of reducing a titanium compound represented by the following formula [I] with an organomagnesium compound in the presence of an organosilicon compound having an Si—O bond, an ester compound and a fine particle of a layered inorganic substance having a volume average particle diameter of 0.1 nm to 1 mm,

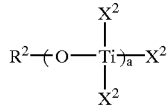

wherein "a" is a number of 1 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another.

3. The process according to claim 1, wherein the layered inorganic substance is a layered silicate compound.

4. The process according to claim 3, wherein the layered silicate compound is a lipophilic smectite.

5. A process for producing a solid catalyst component for olefin polymerization, which comprises the step of contacting:

(i) a solid product obtained by a process, which comprises the step of reducing a titanium compound represented by the following formula [I] with an organomagnesium compound in the presence of an organosilicon compound having an Si—O bond and a fine particle of a layered inorganic substance having a volume average particle diameter of 0.1 nm to 1 mm,

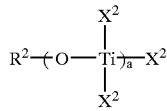

wherein "a" is a number of 1 to 20 $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another, (ii) a halogenation ability-carrying halogeno compound, and (iii) an inner electron donor compound.

6. The process for producing a solid catalyst component for olefin polymerization according to claim 5, wherein the halogenation ability-carrying halogeno compound contains at least one halogeno compound selected from the group consisting of an organic acid halide, a compound having a Ti-halogen bond and a halogeno compound of the 13 or 14 group element.

7. A process for producing a solid catalyst component for olefin polymerization, which comprises the step of contacting:

(i) a solid product obtained by a process, which comprises the step of reducing a titanium compound represented by the following formula [I] with an organomagnesium compound in the presence of an organosilicon compound having an Si—O bond, an ester compound and a fine particle of a layered inorganic substance having a volume average particle diameter of 0.1 nm to 1 mm,

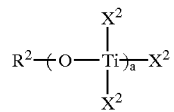

wherein "a" is a number of 1 to 20 $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another, (ii) a halogenation ability-carrying halogeno compound, and (iii) an inner electron donor compound.

8. The process for producing a solid catalyst component for olefin polymerization according to claim 7, wherein the halogenation ability-carrying halogeno compound contains at least one halogeno compound selected from the group consisting of an organic acid halide, a compound having a Ti-halogen bond and a halogeno compound of the 13 or 14 group element.

9. The process according to claim 5, wherein the layered inorganic substance is a layered silicate compound.

10. The process according to claim 9, wherein the layered silicate compound is a lipophilic smectite.

11. The process according to claim 5, wherein the layered inorganic substance is a layered silicate compound.

12. The process according to claim 11, wherein the layered silicate compound is a lipophilic smectite.

13. A process for producing a catalyst for olefin polymerization, which comprises the step of contacting:

(a) a solid catalyst component for olefin polymerization obtained by a process comprising the step of contacting:

(i) a solid product obtained by a process, which comprises the step of reducing a titanium compound represented by the following formula [I] with an organomagnesium compound in the presence of an organosilicon compound having an Si—O bond and a fine particle of a layered inorganic substance having a volume average particle diameter of 0.1 nm to 1 mm,

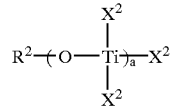

wherein "a" is a number of 1 to 20, $R^2$ a hydrocarbon group having 1 to 20 carbon atoms, and $X^2$ is a halogen atom or a hydrocarbyloxy group having 1 to 20 carbon atoms, and all of $X^2$ may be the same or different from one another, (ii) a halogenation ability-carrying halogeno compound, and (iii) an inner electron donor compound, (b) an organoaluminum compound, and (c) an outer electron donor compound.

14. A process for producing a catalyst for olefin polymerization, which comprises the step of contacting:

(a) a solid catalyst component for olefin polymerization obtained by a process comprising the step of contacting:

(i) a solid product obtained by a process, which comprises the step of reducing a titanium compound represented by the following formula [I] with an organomagnesium compound in the presence of an organosilicon compound having an Si—O bond, an ester compound and a fine particle of a layered inorganic substance having a volume average particle diameter of 0.1 nm to 1 mm,

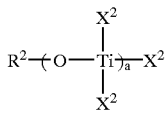
[I]

wherein "a" is a number of 1 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another, (ii) a halogenation ability-carrying halogeno compound, and (iii) an inner electron donor compound, (b) an organoaluminum compound, and (c) an outer electron donor compound.

15. The process according to claim 13, wherein the layered inorganic substance is a layered silicate compound.

16. The process according to claim 15, wherein the layered silicate compound is a lipophilic smectite.

17. The process according to claim 14, wherein the layered inorganic substance is a layered silicate compound.

18. The process according to claim 17, wherein the layered silicate compound is a lipophilic smectite.

19. A process for producing an olefin polymer, which comprises the step of polymerizing an olefin in the presence of a catalyst for olefin polymerization obtained by a process comprising the step of contacting:

(a) a solid catalyst component for olefin polymerization obtained by a process comprising the step of contacting:

(i) a solid product obtained by a process, which comprises the step of reducing a titanium compound represented by the following formula [I] with an organomagnesium compound in the presence of an organosilicon compound having an Si—O bond and a fine particle of a layered inorganic substance having a volume average particle diameter of 0.1 nm to 1 mm,

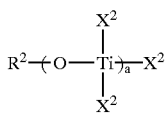
[I]

wherein "a" is a number of 1 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another, (ii) a halogenation ability-carrying halogeno compound, and (iii) an inner electron donor compound, (b) an organoaluminum compound, and (c) an outer electron donor compound.

20. The process for producing an olefin polymer according to claim 19, wherein the olefin comprises ethylene or α-olefin.

21. A process for producing an olefin polymer, which comprises the step of polymerizing an olefin in the presence of a catalyst for olefin polymerization obtained by a process comprising the step of contacting:

(a) a solid catalyst component for olefin polymerization obtained by a process comprising the step of contacting:

(i) a solid product obtained by a process, which comprises the step of reducing a titanium compound represented by the following formula [I] with an organomagnesium compound in the presence of an organosilicon compound having an Si—O bond, an ester compound and a fine particle of a layered inorganic substance having a volume average particle diameter of 0.1 nm to 1 mm,

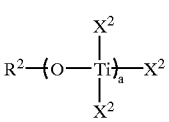
[I]

wherein "a" is a number of 1 to 20, $R^2$ is a hydrocarbon group having 1 to 20 carbon atoms, and $X^2$ is a halogen atom or a hydrocarbyloxy group having 1 to 20 carbon atoms, and all of $X^2$ may be the same or different from one another, (ii) a halogenation ability-carrying halogeno compound, and (iii) an inner electron donor compound, (b) an organoaluminum compound, and (c) an outer electron donor compound.

22. The process for producing an olefin polymer according to claim 21, wherein the olefin comprises ethylene or α-olefin.

23. The process according to claim 19, wherein the layered inorganic substance is a layered silicate compound.

24. The process according to claim 23, wherein the layered silicate compound is a lipophilic smectite.

25. The process according to claim 21, wherein the layered inorganic substance is a layered silicate compound.

26. The process according to claim 25, wherein the layered silicate compound is a lipophilic smectite.

* * * * *